United States Patent Office

3,655,724
Patented Apr. 11, 1972

3,655,724
PROCESS OF DIMERIZING ACRYLONITRILE
William Joseph Linn and Alvin Barber Stiles, Wilmington, Del., assignors to E. I. du Pont de Nemours and Company, Wilmington, Del.
No Drawing. Original application July 19, 1967, Ser. No. 654,329, now Patent No. 3,562,181, dated Feb. 9, 1971. Divided and this application Aug. 27, 1969, Ser. No. 853,514
Int. Cl. C07c 121/26, 121/30
U.S. Cl. 260—465.8
6 Claims

ABSTRACT OF THE DISCLOSURE

Acrylonitrile can be efficiently dimerized by hydrogen in the presence of a catalyst formed by the reaction of soluble ruthenium compounds with salts of weak acids and adsorbed on charcoal or $\eta$ alumina. The selected supports enhance the yield obtained.

RELATED APPLICATION

This application is a division of our copending application S.N. 654,329 filed July 19, 1967, now U.S. 3,562,181.

FIELD OF THE INVENTION

The invention relates to a process for the preparation of dinitriles from acrylonitrile.

BACKGROUND OF THE INVENTION

Heretofore adiponitrile, which is an intermediate in the production of some polyamides, has been a relatively high cost chemical, since the commercial manufacture requires a series of steps employing poisonous gases or the use of electric power. Recently it has been discovered that ruthenium metal and salts thereof effective catalysts for the preparation of adiponitrile and its precursor 1,4-dicyano-1-butene by the dimerization of acrylonitrile in the presence of hydrogen. Many of the new catalysts are soluble in, or form colloidal disperions in, the reaction medium. Such catalysts are undesirable for commercial operation since they present recovery problems. Further, it is desirable to enhance the yield of these catalysts to reduce the cost of the desired end-product, adiponitrile.

SUMMARY OF THE INVENTION

The present invention comprises a process for the production of organic dinitriles from acrylonitrile which comprises contacting and reacting acrylonitrile with an atmosphere comprising gaseous hydrogen at a pressure in the range between atmospheric pressure and 9000 p.s.i. and at a temperature in the range between about 80° C. and 175° C. in the presence of a catalytic amount of a catalyst comprising the reaction product, prepared in aqueous solution, of a water soluble ruthenium salt with a water soluble salt of an organic acid having a pK$_a$, in aqueous solution, from 2.5 to 5.5, said reaction product being absorbed on a catalyst support of amorphous carbon or activated $\eta$ alumina, and recovering organic dinitriles from the reaction product.

PREPARATION OF THE CATALYST

The catalyst is prepared by reaction in aqueous solution of a water-soluble ruthenium salt and a water-soluble salt of a selected organic acid. The preparation is preferably conducted in the presence of the support. Effective catalysts can, however, be prepared by reacting the soluble components to form a complex ruthenium-organic acid compound which is then adsorbed on the support.

The salts of ruthenium which can be employed are those water-soluble halide salts of ruthenium in which the valance of the ruthenium is +3 or +4 including simple salts wherein ruthenium is the sole cation and complex salts in which the cation includes ammonium or alkali metal cations, that is salts having the formula

$$M_nRuX_{n+m}$$

when M is an alkali metal or ammonium cation X is halogen and $m$ is 3, or 4, and $n$ is 0, 1, 2 or 3 when $m$ is 3 and $n=0$ or 2 when $m=4$. The coordination sphere may be completed with hydroxyl groups or water of hydration. With certain salts of ruthenium, a mineral acid may be needed to prevent hydrolysis to ill-defined insoluble basic salts. In that case, enough of the reacting salt of the organic acid must be employed to react with the mineral acid as well as to provide a minimum of about 1 mole of organic acid per gram atom of ruthenium. Generally an excess of the water-soluble salt of the organic acid is employed. This can be sufficient to provide 10 moles of the salt of the organic acid per gram atom of ruthenium.

The organic carboxylic acid, the salt of which is employed as the second reactant, should have a pK$_a$ of 2.5 to 5.5. Suitable acids include formic acid, acetic acid, chloroacetic acid, hydroxyacetic acid, diethylacetic acid, bromoacetic acid, propionic acid, $\alpha$-bromopropionic acid, n-butyric acid, isobutyric acid, pivalic acid, n-caproic acid, n-caprylic acid, acrylic acid, crotonic acid, adipic acid, pimelic acid, maleic acid, fumaric acid, benzoic acid, o-, m- or p-toluic acids, $\alpha$- or $\beta$-napthoic acids, o-, m- or p-chlorobenzoic acids, m- or p-nitrobenzoic acids, and cinnamic acid.

Any salt of the above acids can be employed which is sufficiently water soluble. Suitable cations include ammonium, alkyl ammonium, or metals from Groups I$a$, II$a$, I$b$, II$b$ or VIII of the Periodic Table of the Elements provided the selected salt is water soluble.

The reaction between the ruthenium salt and the salt of the organic acid is conducted in aqueous solution. The proportions of the reactants are not critical, provided that a sufficient amount of the salt of the organic acid is present to react with the ruthenium compound, i.e. about 1 to about 10 gram moles of the salt of the organic acid per gram atom of ruthenium. The temperature at which the reaction is conducted is likewise not critical, but is preferably between about 50° C. and about 85° C. to promote the reaction between the components and adsorption of the reaction product on the support.

The catalyst support is a critical feature of this invention. It has been found that the use of selected catalyst supports provides insoluble catalysts which are particularly adapted to use in continuous processes and in which the activity of the reaction product between soluble ruthenium salts and the soluble salts of organic acids is enhanced. The reaction products can be loosely called the ruthenium salts of the organic acids, but are, in fact, basic compounds when prepared as described hereinabove. The ruthenium salts of organic acids normally are active catalysts, but the activity is substantially enhanced when the compounds are adsorbed on the selected supports. The selected supports are activated carbon, having a surface area preferably greater than 400 m.$^2$/g. and $\eta$ alumina. The amount of the support is chosen relative to the proportions of the water soluble ruthenium salt and the water-soluble organic acid salt to give a final concentration of from about 0.1 to about 10% by weight of ruthenium, calculated as metal. The only effect of ruthenium concentration on the support appears to be on the rate of reaction, higher concentrations of ruthenium giving higher rates of reaction. The preferred concentration for operating convenience and ready preparation of the catalyst is about 5% by weight.

After adsorbing the catalyst on the support, the catalyst can be separated by filtration, washed with water to remove surplus salts and dried in air or in vacuum. The washing step however is optional.

USE OF THE CATALYSTS FOR DIMERIZATION OF ACRYLONITRILE

The catalysts of the present invention can be used for the dimerization of acrylonitrile in the presence of hydrogen by contacting the reactants with a catalytic amount of a catalyst defined hereabove at a temperature in the range between about 80° C. to about 175° C., preferably 100°–135° C., at a pressure between atmospheric pressure and 9000 p.s.i., preferably from 100 to 500 p.s.i.

The reaction can be conducted in the presence of a solvent inert to the reactants and products, such as aliphatic and aromatic hydrocarbons and halohydrocarbons, alcohols, ethers, nitriles, amides and phosphoramides. Solvents, however, are not necessary in the process of this invention and are not preferred, since it is necessary to separate the products from the solvent.

The process of the present invention can be conducted in a batch process or, alternatively and for commercial operation preferably, the reaction can be conducted con-

EXAMPLES 1–12

Examples 1–12 demonstrate the use of supported catalysts prepared from aqueous solutions of ruthenium trichloride trihydrate and various carboxylic acid salts in the presence of amorphous carbon. The $pK_a$ range of the conjugate acids of these salts is 2.86 to 5.05.

The catalysts were prepared by the following procedure: A solution of $RuCl_3 \cdot 3H_2O$ in 0.6 N HCl (59 mg. $RuCl_3 \cdot 3H_2O$ per ml.) was heated to about 65° C., 9.0 g. of the carbon and was stirred in, and an aqueous solution of the salt as indicated was added with stirring at about 65° C. over a period of about six minutes. The suspension was stirred and heated at 65–71° C. for one hour, after which it was cooled to room temperature and filtered. The solids were washed on the filter with distilled water until the washings were free of chloride ion. The catalyst was then dried at room temperature in the open air for 15 minutes and under reduced pressure overnight.

The catalysts included in Table 1 were tested by the following procedure: A mixture of 0.2 g. of the catalyst and 20 ml. (16 g.) of acrylonitrile in a stainless steel pressure vessel was agitated and heated at 125° C. under 200 lb./sq. in. hydrogen pressure for 12 hours. The pressure was maintained by repressuring from time to time

TABLE I

| Example | $RuCl_3 \cdot 3H_2O$ (g.) | Precipitant solution | Support | $pK_a$ of acid | Yield of $C_6$ linear dinitrile[a] (percent) | Conversion of acrylonitrile (percent) |
|---|---|---|---|---|---|---|
| 1[b] | [c] 1.16 | 38 ml. 10% ammonium acetate | Powdered carbon | 4.76 | 65.2 | 94.5 |
| 2 | 1.16 | do | Granular carbon[d] | 4.76 | 54.8 | 95.2 |
| 3 | 0.58 | 19 ml. 10% ammonium acetate | do | 4.76 | 55.4 | 42.2 |
| 4 | 2.32 | 76 ml. 10% ammonium acetate | do | 4.76 | 52.8 | 99.9 |
| 5 | 1.16 | 40 ml. 10% sodium acetate | Powdered carbon | 4.76 | 57.2 | 58.2 |
| 6 | 1.16 | 30 ml. 10% ammonium formate | do | 3.75 | 56.7 | 81.0 |
| 7 | 1.16 | 47 ml. 10% ammonium chloroacetate | Granular carbon | 2.86 | 58.8 | 48.3 |
| 8 | 1.16 | 48 ml. 10% potassium acetate | do | 4.76 | 55.7 | 83.0 |
| 9 | 1.16 | 50 ml. 20% magnesium acetate tetrahydrate | do | 4.76 | 53.5 | 97.9 |
| 10 | 1.16 | 4.3 g. of ammonium hydroxyacetate in 40 ml. of water | do | 3.82 | 57.3 | 68.9 |
| 11 | 1.16 | 11.56 g. cobaltous acetate tetrahydrate in 50 ml. of water | do | 4.76 | 60.3 | 96.4 |
| 12[e] | 1.16 | 5.5 g. ammonium pivalate in 25 ml. of water | Powdered carbon | 5.05 | 51.3 | 99.9 |

[a] $C_6$ linear dinitriles are the total of cis- and trans-1,4-dicyano-1-butene and adiponitrile in the liquid product. Yield is based on expended (unrecovered) acrylonitrile.
[b] The preparation of catalyst in this instance involved use of 15 ml. of 0.8 N HCl initially and later addition of 15–20 ml. of water to keep the mixture fluid. Also, the wet solid was divided into two portions, only one of which was washed free of chloride ion. The demirization test was made with the washed catalyst.
[c] Catalysts from 1.16 g. $RuCl_3 \cdot 3H_2O$ contain about 5% Ru (as organic acid derivative). Other amounts of $RuCl_3 \cdot 3H_2O$ give proportionately more, or less Ru on the support.
[d] Granular carbon was 6–14 mesh charcoal.
[e] The dimerization test was made with 0.5 g. of catalyst.

tinuously by passing acrylonitrile and hydrogen at the above-described temperature and pressure over a bed of the catalyst. After passing the acrylonitrile in an atmosphere of hydrogen over the catalyst bed, the product dinitriles (adiponitrile, cis- and trans-1,4-dicyano-1-butene) are separated; the unchanged acrylonitrile is recovered and recycled; and the propionitrile formed as a by-product by hydrogenation of the acrylonitrile is also recovered, dehydrogenated to acrylonitrile by known procedures such as that taught in U.S. Pat. 2,554,482, and in the form of acrylonitrile is returned to the recycle stream.

This invention is further illustrated by the following examples in which parts are given by weight unless otherwise stated. It is to be understood, however, that these examples are not intended to fully delineate the scope of this discovery.

as needed. The reaction vessel was cooled and carefully vented, after which the reaction mixture was removed and filtered to separate the liquid product from the catalyst. The liquid product was analyzed by gas chromatography for unchanged acrylonitrile, propionitrile, cis- and trans-1,4-dicyano-1-butene, and adiponitrile.

EXAMPLES 13–15

Examples 13 and 14 demonstrate the use of catalysts prepared from ammonium hexachlororuthenate $$[(NH_4)_3RuCl_6]$$

with ammonium acetate and sodium benzoate, respectively, on granular carbon. The general procedures for catalyst preparation and testing are the same as for Examples 1–12.

TABLE II

| Example | $(NH_4)_2RuCl_6$ (g.) | Precipitant solution | $pK_a$ of conjugate acid | Yield of $C_6$ linear dinitriles (percent) | Conversion of acrylonitrile (percent) |
|---|---|---|---|---|---|
| 13[a] | [b] 1.47 | 38 ml. 10% ammonium acetate | 4.76 | 55.5 | 99.5 |
| 14 | 1.47 | 30 ml. $H_2O$ containing 6.62 g. sodium benzoate | 4.20 | 56.3 | 78.7 |

[a] The wet catalyst was washed with 150 ml. of 10% aqueous ammonium acetate and then successively with three 50-ml. portions of distilled water.
[b] This amount of $(NH_4)_2RuCl_6$ gives catalyst containing about 5% Ru (as acetate derivative) on the support.

EXAMPLES 15–16

Examples 15 and 16 demonstrate the use of a catalyst containing 5% Ru (as acetate derivative) on η-alumina and the effect of temperature in the dimerization. The catalyst was prepared by the method described for the carbon-supported catalysts of Examples 1–12, using 1.16 g. of $RuCl_3 \cdot 3H_2O$, 38 ml. of 10% ammonium acetate, and 9.0 g. of powdered $\eta$-$Al_2O_3$. However, the procedure was altered somewhat in that introduction of the alumina to the mixture was withheld until sufficient ammonium acetate had been added to give a pH of 2.7, and the wet catalyst was washed with 120 ml. of 5% ammonium acetate prior to the washing with distilled water.

In the dimerization test, the amount of supported catalyst and the temperature were varied, as indicated in Table III.

TABLE III

| Example | Weight of catalyst (g.) | Temperature (° C.) | Yield of $C_6$ linear dinitriles (percent) | Conversion of acrylonitrile (percent) |
|---|---|---|---|---|
| 15 | 0.2 | 125 | 49.8 | 99.4 |
| 16 | 0.5 | 100 | 60.7 | 21.1 |

EXAMPLES 17–26 (TABLE IV)

Examples 17–26 demonstrate the use of various solvents in the dimerization of acrylonitrile with a 5% Ru-on-carbon catalyst (Ru as acetate derivative), and the effects of changes in hydrogen pressure and quantity of catalyst with one of the solvents. In Examples 18–26, the standard test procedure of Examples 1–12 was followed, with the addition of 20 ml. of solvent to the reaction mixture and using 0.5 g. (except where noted) of the catalyst of Example 2.

TABLE IV

| Example | Solvent | Yield of $C_6$ linear dinitriles (percent) | Conversion of acrylonitrile (percent) |
|---|---|---|---|
| 17 [a] | Hexamethylphosphoramide | 49.3 | 38.3 |
| 18 [b] | do | 61.9 | 31.5 |
| 19 | do | 57.2 | 66.8 |
| 20 | Dimethylacetamide | 48.8 | 95.7 |
| 21 | Dimethylformamide | 51.0 | 100 |
| 22 | Absolute ethanol | 51.8 | 100 |
| 23 | n-Butanol | 55.1 | 99.8 |
| 24 | 2-methoxyethanol | 56.8 | 99.8 |
| 25 | Acetonitrile | 50.1 | 100 |
| 26 | Toluene | 53.7 | 100 |

[a] The test procedure involved use of 1.0 g. of the catalyst of Example 1, 40 ml. of solvent, 11.2 g. of acrylonitrile, and 40 lb./sq. in. hydrogen pressure. The heating time was 16½ hours.
[b] 0.2 g. of catalyst was used.

EXAMPLES 27–28

Examples 27 and 28 demonstrate the influence of a catalyst support on the relative proportions of dicyanobutene and adiponitrile in the $C_6$ linear dinitrile portion of the product. The test procedure of Examples 1–12 was followed.

TABLE V

| Ex. | Catalyst [a] | Composition of product | | |
|---|---|---|---|---|
| | | Dicyanobutene (percent) | Adiponitrile (percent) | Propionitrile (percent) |
| 27 | 1.0 g. catalyst of Example 1 | 8.8 | 43.2 | 52.1 |
| 28 | 0.13 g. $RuCl_3 \cdot H_2O$ [1] | 47.5 | 8.9 | 41.4 |

[a] Each catalyst contained about 0.05 g. of ruthenium.
[b] No support or precipitant.

EXAMPLES 29–31

Examples 29–31 demonstrate the effects of certain variations in the preparation of insoluble unsupported and carbon-supported catalysts based on $RuCl_3 \cdot 3H_2O$ and ammonium acetate. The primary colloidal ruthenium-containing suspension was prepared by adding 40 ml. of 10% aqueous ammonium acetate dropwise to a solution of 1.16 g. $RuCl_3 \cdot 3H_2O$ in 20 ml. of 0.6 N HCl. The test procedure follows that described for Examples 1–12.

In Example 30, the primary colloid was neutralized with sodium carbonate to obtain a neutral unsupported catalyst which would be closely comparable in neutrality to a water-washed supported catalyst. Otherwise, the presence of sodium carbonate is immaterial in the dimerization test.

TABLE VI

| Ex. | Catalyst | Yield of $C_6$ linear dinitriles (percent) | Conversion of acrylonitrile (percent) |
|---|---|---|---|
| 29 | 15.6 mg. Ru as primary colloid | 19.0 | 40.6 |
| 30 | 20 mg. Ru as primary colloid neutralized to pH 7.0 with 20% $Na_2CO_3$ solution | 37.9 | 99.9 |
| 31 [a] | 10 mg. Ru on powdered carbon [b] | 55.5 | 99.8 |

[a] It can be shown that the catalytic activity of a supported catalyst is not diminished by adding water to the test mixture.
[b] The catalyst was obtained by adding 9.0 g. of powdered charcoal to the primary colloid and thereafter following the procedure of Examples 1–12 for catalyst preparation.

The embodiments of the invention in which an exclusive property or privilege is claimed are defined as follows:

1. A method of dimerizing acrylonitrile to linear dinitriles which comprises contacting and reacting acrylonitrile in the presence of hydrogen at a pressure between atmospheric pressure and 9000 p.s.i., and at a temperature in the range between about 80° C. and 175° C. with a catalytic amount of a catalyst consisting essentially of amorphous carbon or η-alumina having adsorbed thereon the reaction product, in aqueous solution, of a water soluble ruthenium salt and a water soluble salt of an organic acid, said organic acid having a $pk_a$, measured in aqueous solution of from 2.5 to 5.5.

2. The process of claim 1 in which said water soluble salt of an organic acid is ammonium acetate, sodium acetate, potassium acetate, magnesium acetate, cobalt acetate, ammonium formate, ammonium chloroacetate, ammonium pivalate, ammonium hydroxyacetate or sodium benzoate.

3. The process of claim 2 in which the water soluble ruthenium salt has the formula $$M_nRuX_{n+m}$$

wherein M is an alkali metal cation or ammonium cation, X is halogen, $m$ is 3 or 4 and $n$ is 0, 1, 2 or 3 when $m$ is 3 and $n$ is 0 or 2 when $m$ is 4.

4. The process of claim 3 in which said reaction product is formed in the presence of said amorphous carbon or said η alumina.

5. The process of claim 4 in which the reaction product is formed at a temperature of about 50° C. to about 85° C.

6. The process of claim 5 in which the pressure is from 100 to 500 p.s.i.

References Cited
UNITED STATES PATENTS 3,013,066   12/1961   Alderson  260—465.8 D JOSEPH P. BRUST, Primary Examiner